United States Patent
Sullivan et al.

(10) Patent No.: US 9,892,188 B2
(45) Date of Patent: Feb. 13, 2018

(54) CATEGORY-PREFIXED DATA BATCHING OF CODED MEDIA DATA IN MULTIPLE CATEGORIES

(71) Applicant: Microsoft Corporation, Redmond, WA (US)

(72) Inventors: Gary J. Sullivan, Bellevue, WA (US); Leon Bottou, Kirkland, WA (US); Sandeep Kanumuri, Redmond, WA (US); Yongjun Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 695 days.

(21) Appl. No.: 13/672,684

(22) Filed: Nov. 8, 2012

(65) Prior Publication Data

US 2013/0117270 A1 May 9, 2013

Related U.S. Application Data

(60) Provisional application No. 61/557,408, filed on Nov. 8, 2011, provisional application No. 61/625,513, filed on Apr. 17, 2012.

(51) Int. Cl.
*G06F 17/30* (2006.01)
*H04N 19/44* (2014.01)

(52) U.S. Cl.
CPC ....... *G06F 17/30598* (2013.01); *H04N 19/44* (2014.11)

(58) Field of Classification Search
CPC .... H04N 19/44; G06F 17/30598; G06F 17/30
(Continued)

(56) References Cited

U.S. PATENT DOCUMENTS 5,612,900 A * 3/1997 Azadegan et al. ............ 709/247
2004/0047424 A1 * 3/2004 Ramaswamy ....... H04N 21/235
375/240.27

(Continued)

OTHER PUBLICATIONS

Bossen, "Common test conditions and software reference configurations," JCTVC-H1100, 3 pp. (Feb. 2012).
(Continued)

*Primary Examiner* — Tung Vo
*Assistant Examiner* — Zaihan Jiang
(74) *Attorney, Agent, or Firm* — Klarquist Sparkman, LLP

(57) ABSTRACT

Innovations for category-prefixed data batching ("CPDB") of entropy-coded data or other payload data for coded media data, as well as innovations for corresponding recovery of the entropy-coded data (or other payload data) formatted with CPDB. The CPDB can be used in conjunction with coding/decoding for video content, image content, audio content or another type of content. For example, after receiving coded media data in multiple categories from encoding units, a formatting tool formats payload data with CPDB, generating a batch prefix for a batch of the CPDB-formatted payload data. The batch prefix includes a category identifier and a data quantity indicator. The formatting tool outputs the CPDB-formatted payload data to a bitstream. At the decoder side, a formatting tool receives the CPDB-formatted payload data in a bitstream, recovers the payload data from the CPDB-formatted payload data, and outputs the payload data (e.g., to decoding units).

24 Claims, 9 Drawing Sheets

(58) Field of Classification Search
USPC .............. 375/295, 240, E7.083; 348/384.1; 382/232
See application file for complete search history.

(56) References Cited

U.S. PATENT DOCUMENTS

| | | | | |
|---|---|---|---|---|
| 2009/0010331 | A1* | 1/2009 | Jeon et al. ............... | 375/240.12 |
| 2011/0200104 | A1* | 8/2011 | Korodi et al. ........... | 375/240.12 |
| 2011/0248872 | A1* | 10/2011 | Korodi .................... | H03M 7/40 341/67 |
| 2011/0254712 | A1* | 10/2011 | He et al. ................. | 341/87 |
| 2011/0274180 | A1* | 11/2011 | Lee et al. ................ | 375/240.25 |
| 2012/0236115 | A1* | 9/2012 | Zhang ................. | H04N 19/597 348/43 |
| 2012/0281768 | A1* | 11/2012 | Matsuba ............... | H04N 19/91 375/240.24 |
| 2012/0287994 | A1* | 11/2012 | Van der Auwera et al. ......................... | 375/240.12 |
| 2012/0328003 | A1* | 12/2012 | Chien ................. | H04N 19/176 375/240.03 |

OTHER PUBLICATIONS

Bross et al., "High efficiency video coding (HEVC) text specification draft 6," JCTVC-H1003, 260 pp. (Feb. 2012).
Bross et al., "WD4: Working Draft 4 of High Efficiency Video Coding ," JCTVC-F803_d5, 233 pp. (Jul. 2011).
Clare et al., "Wavefront and Cabac Flush: Different Degrees of Parallelism Without Transcoding," JCTVC-F275, 11 pp. (Jul. 2011).
Clare et al., "Wavefront Parallel Processing for HEVC Encoding and Decoding," JCTVC-F274, 16 pp. (Jul. 2011).
Fuldseth et al., "Tiles," JCTVC-F335, 15 pp. (Jul. 2011).
He et al., "Opportunistic parallel V2V decoding," JCTVC-C279, 3 pp. (Oct. 2010).
He et al., "Video Coding Technology Proposal by RIM," JCTVC-A120, 29 pp. (Apr. 2010).
Hendry, "AHG4: Harmonized Method for Signalling Entry Points of tiles and WPP Substreams," JCTVC-H0566, 7 pp. (Feb. 2012).
ITU-T Recommendation T.88, "Series T: Terminals for Telematic Services—Information Technology—Lossy/lossless coding of bi-level images," 164 pp. (Feb. 2000).
ITU-T Recommendation H.264, "Series H: Audiovisual and Multimedia Systems—Infrastructure of audiovisual services—Coding of moving video," 676 pp. (Mar. 2010).
JBIG Committee, "Coding of Still Pictures," 14492 FCD, 189 pp. (1999).
Kanumuri et al., "AHG4: Category-prefixed data batching for tiles and wavefronts," JCTVC-I0427, 7 pp. (May 2012).
Kanumuri et al., "AHG4: Category-prefixed data batching for tiles and wavefronts," PowerPoint Slides, JCTVC-I0427, 10 pp. (May 2012).
Kirchhoffer et al., "Reduced complexity PIPE coding using systematic v2v codes," JCTVC-D380, 10 pp. (Jan. 2011).
Marpe et al., "Novel entropy coding concept," JCTVC-A032, 17 pp. (Apr. 2010).
Marpe et al., "Unified PIPE-Based Entropy Coding for HEVC," JCTVC-F268, 21 pp. (Jul. 2011).
Misra, "New results for parallel decoding for Tiles," JCTVC-F594, 6 pp. (Jul. 2011).
Morrison et al., "'EA IFF 85' Standard for Interchange Format Files," downloaded from: http://www.martinreddy.net/gfx/2d/IFF.txt, 22 pp. (Jan. 1985).
Reibman et al., "Scalable video coding with managed drift," *IEEE Trans. On Circuits and Systems for Video Technology*, 29 pp. (Feb. 2003).
Sugimoto et al., "Improved PIPE/V2F for low complexity entropy coding," JCTVC-F176, 7 pp. (Jul. 2011).
Sullivan, "Category-prefixed data batching for HEVC wavefront and PIPE/V2V/V2F coding," JCTVC-G815, 2 pp. (Nov. 2011).
Winken et al., "Description of video coding technology proposal by Fraunhofer HHI," JCTVC-A116, 44 pp. (Apr. 2010).

* cited by examiner software 180 implementing one or more
innovations for category-prefixed data batching

Figure 8a      801

| slice_data_rbsp() { | Descriptor |
|---|---|
| for( i = 0; i < 32; i++ ) | |
| NumBytesInCategory[i] = 0 | |
| while ( more_rbsp_data() ) | |
| cpdb_unit(NumBytesInCategory) | |
| cpdb_merge(NumBytesInCategory) | |
| } | |

Figure 8b      802

| cpdb_unit(NumBytesInCategory) { | Descriptor |
|---|---|
| abbreviated_data_quantity_indicator | u(3) |
| category_identifier | u(5) |
| if (abbreviated_data_quantity_indicator == 7) | |
| data_quantity_indicator_extension | u(8) |
| NumBytesInCPDBunit /* inferred from abbreviated_data_quantity_indicator and data_quantity_indicator_extension, when present */ | |
| for( i = 0; i < NumBytesInCPDBunit; i++ ) { | |
| if( i + 3 < NumBytesInCPDBunit && next_bits( 24 ) <= 0x000003 ) { | |
| ocp_ss_byte[category_identifier][ NumBytesInCategory[category_identifier]++ ] | b(8) |
| ocp_ss_byte[category_identifier][ NumBytesInCategory[category_identifier]++ ] | b(8) |
| /* emulation prevention byte already removed – size of CPDB includes them */ | |
| i += 2 | |
| } else if ( i + 3 == NumBytesInCPDBunit && next_bits( 16 ) == 0x0000 ) | |
| ocp_ss_byte[category_identifier][ NumBytesInCategory[category_identifier]++ ] | b(8) |
| ocp_ss_byte[category_identifier][ NumBytesInCategory[category_identifier]++ ] | b(8) |
| cpdb_filler_four_byte /* equal to 0x04 */ | f(8) |
| i += 2 | |
| } else | |
| ocp_ss_byte[category_identifier][ NumBytesInCategory[category_identifier]++ ] | b(8) |
| } | |
| } | |

Figure 8c                                         803

| cpdb_merge(NumBytesInCategory) {                       | Descriptor |
|---|---|
|   NumBytesInOCP = 0                          |   |
|   for( i = 0; i < 32; i++ ) {                |   |
|     if ( NumBytesInCategory[i] > 0 ) { |   |
|       for ( j = 0; j < NumBytesInCategory[i]; j++) { |   |
|         ocp_byte[NumBytesInOCP++] = ocp_ss_byte[i][j] |   |
|       }                  |   |
|     }                              |   |
|   }                                          |   |
| }                                                      |   |

CATEGORY-PREFIXED DATA BATCHING OF CODED MEDIA DATA IN MULTIPLE CATEGORIES

CROSS REFERENCE TO RELATED APPLICATION

This application claims the benefit of U.S. Provisional Patent Application No. 61/557,408, filed Nov. 8, 2011, the disclosure of which is hereby incorporated by reference. This application also claims the benefit of U.S. Provisional Patent Application No. 61/625,513, filed Apr. 17, 2012, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. More recently, the HEVC standard is under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

A basic goal of compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, depending on the use scenario, considerations such as encoding time, encoding complexity, encoding resources, decoding time, decoding complexity, decoding resources, overall delay, loss recovery capability, and/or smoothness in playback also affect decisions made during encoding and decoding.

In particular, for scenarios such as video conferencing and other real-time video encoding/decoding, overall delay (or latency) can significantly impact the quality of user experience. Reducing latency improves the user experience. At the same time, to exploit the computational power of newer computer hardware, engineers may try to split up encoding tasks at an encoder, or split up decoding tasks at a decoder, so as to more effectively utilize available resources. Existing approaches to splitting up encoding and decoding tasks may introduce more latency than can be tolerated for real-time applications.

SUMMARY

In summary, the detailed description presents innovations for category-prefixed data batching ("CPDB") of entropy-coded data or other payload data for coded media data in multiple categories, as well as innovations for corresponding recovery of the entropy-coded data (or other payload data) formatted with CPDB. The CPDB can be used in conjunction with coding/decoding for video content, image content, audio content or another type of content for payload data other than entropy-coded data. The CPDB can facilitate parallel processing by encoding units of a media encoder and/or decoding units of a media decoder.

Innovations described herein include, but are not limited to the following:

CPDB formatting in which a stream of entropy-coded data or other payload data is organized as "separated mode" batches but finishes with a "mixed mode" batch.

Recovery of entropy-coded data or other payload data from a CPDB-formatted stream that is organized as "separated mode" batches but finishes with a "mixed mode" batch.

CPDB formatting of entropy-coded data or other payload data with a special batch size that shortens prefix length in many cases.

Recovery of entropy-coded data or other payload data that have been formatted with CPDB with a special batch size that shortens prefix length in many cases.

CPDB formatting of entropy-coded data or other payload data with variable-length batch prefixes, which can include a default length indicator or express length value.

Recovery of entropy-coded data or other payload data that have been formatted with CPDB with variable-length batch prefixes.

Formatting of entropy-coded data with CPDB, for use with wavefront decoding in which wavefront entry points are categories for the CPDB.

Recovery of entropy-coded data that have been formatted using CPDB in which wavefront entry points are categories for the CPDB.

Formatting of entropy-coded data with CPDB, for use with probability interval partitioning entropy coding ("PIPE") decoding in which PIPE partition categories are categories for the CPDB.

Recovery of entropy-coded data that have been formatted using CPDB, where PIPE partition categories are categories for the CPDB.

Formatting of entropy-coded data with CPDB, where spatial regions (tiles, slices, etc.) are categories for the CPDB.

Recovery of entropy-coded data that have been formatted using CPDB, where spatial regions (tiles, slices, etc.) are categories for the CPDB.

Emulation prevention byte (EPB) handling in CPDB.

Handling of cases at the end of a batch for EPB purposes in CPDB.

Formatting of the batch prefix in CPDB, including a size indicator in the MSBs and the avoidance of certain values for EPB purposes.

Multiple "special batch sizes" with logarithmically related payload sizes in CPDB.

Custom batch size (or non-special batch size) in a specified range in CPDB.

Mixing "special" and "non-special" batches in any order in CPDB.

Mapping actual data categories to data-batch categories in CPDB.

Efficiently signaling data-batch categories in CPDB.

Combining data-batch categories in CPDB.

Signaling overall CPDB usage.

According to one aspect of the innovations described herein, a formatting tool facilitates parallel processing of coded media data in multiple categories. The formatting tool processes payload data formatted with CPDB. A batch prefix for a batch of the CPDB-formatted payload data includes a category identifier ("CI") and a data quantity indicator ("DQI"). The formatting tool outputs results of the processing. For example, at the encoder side, after receiving coded media data in multiple categories from encoding units of a media encoder (where the encoding units operate in parallel), a formatting tool formats payload data with CPDB (generating the batch prefix for the batch of the CPDB-formatted payload data), then outputs the CPDB-formatted payload data to a bitstream. Or, at the decoder side, a formatting tool receives the CPDB-formatted payload data in a bitstream, recovers the payload data from the CPDB-formatted payload data, and outputs the payload data (e.g., to decoding units that operate in parallel for the decoder).

According to another aspect of the innovations described herein, a formatting tool processes payload data formatted with CPDB. A batch prefix for a batch of the CPDB-formatted payload data includes a CI. If the number of possible values for the CI is less than the number of payload data categories, the payload data categories are grouped to reduce the number of payload data categories to be less than or equal to the number of possible values for the CI. The formatting tool outputs results of the processing. For example, at the encoder side, after receiving coded media data in multiple categories from encoding units of a media encoder, a formatting tool formats payload data with CPDB (generating the batch prefix for the batch of the CPDB-formatted payload data), then outputs the CPDB-formatted payload data to a bitstream. Or, at the decoder side, a formatting tool receives the CPDB-formatted payload data in a bitstream, recovers the payload data from the CPDB-formatted payload data, and outputs the payload data (e.g., to decoding units of the decoder).

The foregoing and other objects, features, and advantages of the invention will become more apparent from the following detailed description, which proceeds with reference to the accompanying figures.

BRIEF DESCRIPTION OF THE DRAWINGS

FIGS. 8a-8c are tables illustrating example bitstream syntax for CPDB-formatted data for a slice.

DETAILED DESCRIPTION

The detailed description presents innovations for category-prefixed data batching ("CPDB") of entropy-coded data or other payload data for coded media data in multiple categories, as well as corresponding recovery of the entropy-coded data (or other payload data) formatted with CPDB. The CPDB can facilitate parallel processing by encoding units of a media encoder and/or decoding units of a media decoder.

Some of the innovations described herein are illustrated with reference to syntax elements and operations specific to the H.264 standard and/or HEVC standard. For example, reference is made to draft versions of the HEVC standard—such as JCTVC-H1003 (version 21)—which is dated Apr. 2, 2012. The innovations described herein can also be implemented for other standards or formats.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of CPDB can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
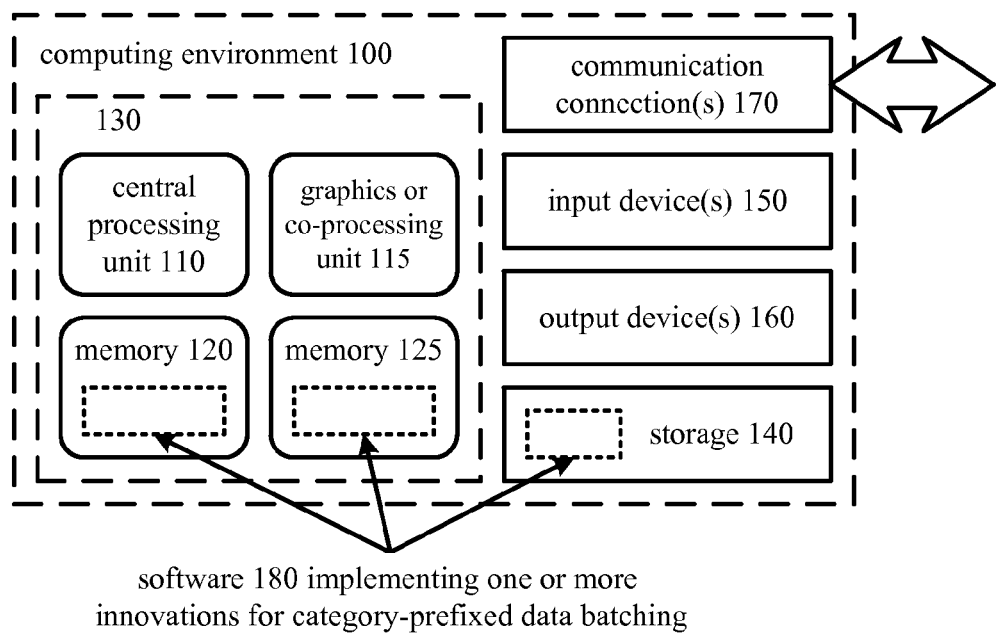
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for CPDB of entropy-coded data or other payload data, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information that can be accessed within the computing system (100). The storage (140) stores instructions for the software (180) implementing one or more innovations for CPDB of entropy-coded data or other payload data.

The input device(s) (150) may be a touch input device such as a keyboard, mouse, pen, or trackball, a voice input device, a scanning device, or another device that provides input to the computing system (100). For video encoding, the input device(s) (150) may be a video capture component such as a camera, video card, TV tuner card, or similar device that accepts video input in analog or digital form, a video capture component such as a screen capture module that captures computer-generated screen images as video or similar component that captures computer-generated image content, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
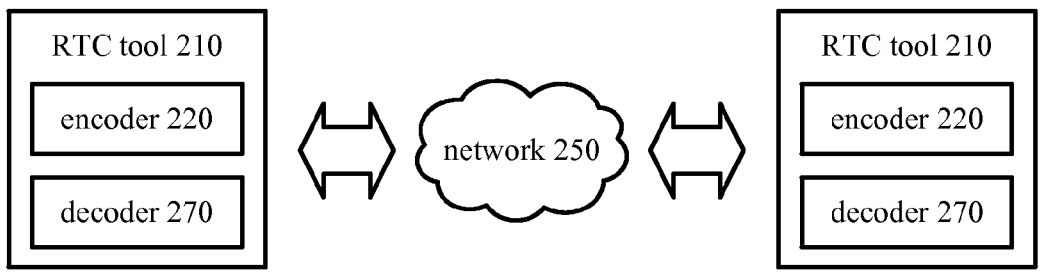
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO/IEC 14496-10 standard (also known as H.264 or AVC), HEVC standard, another standard, or a proprietary format, with a corresponding decoder (270) accepting encoded data from the encoder (220). The real-time communication tool (210) can perform CPDB formatting of the encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
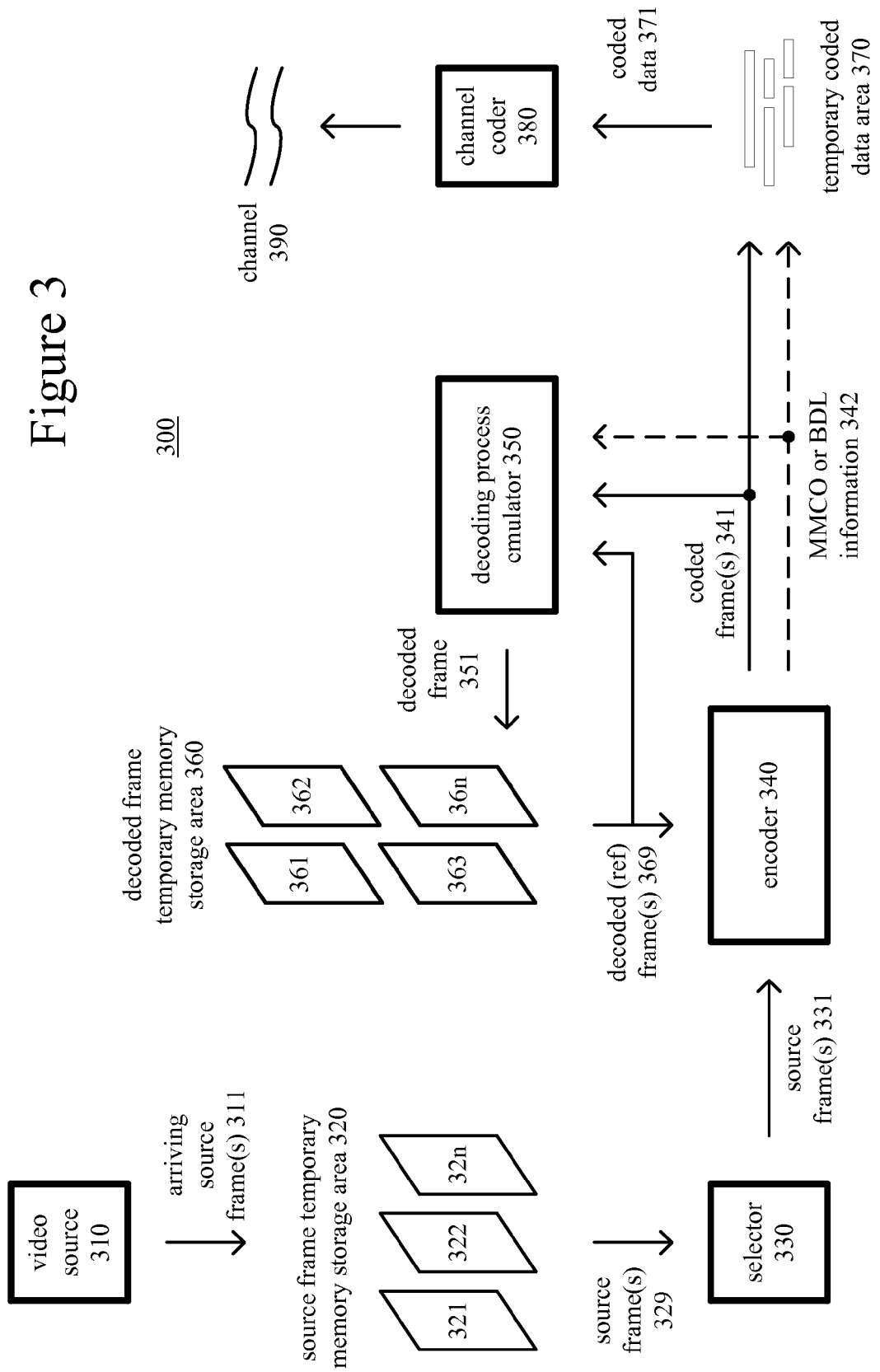
FIG. 3 is a diagram of an example encoder system in conjunction with which some described embodiments can be implemented.
Figure 4:
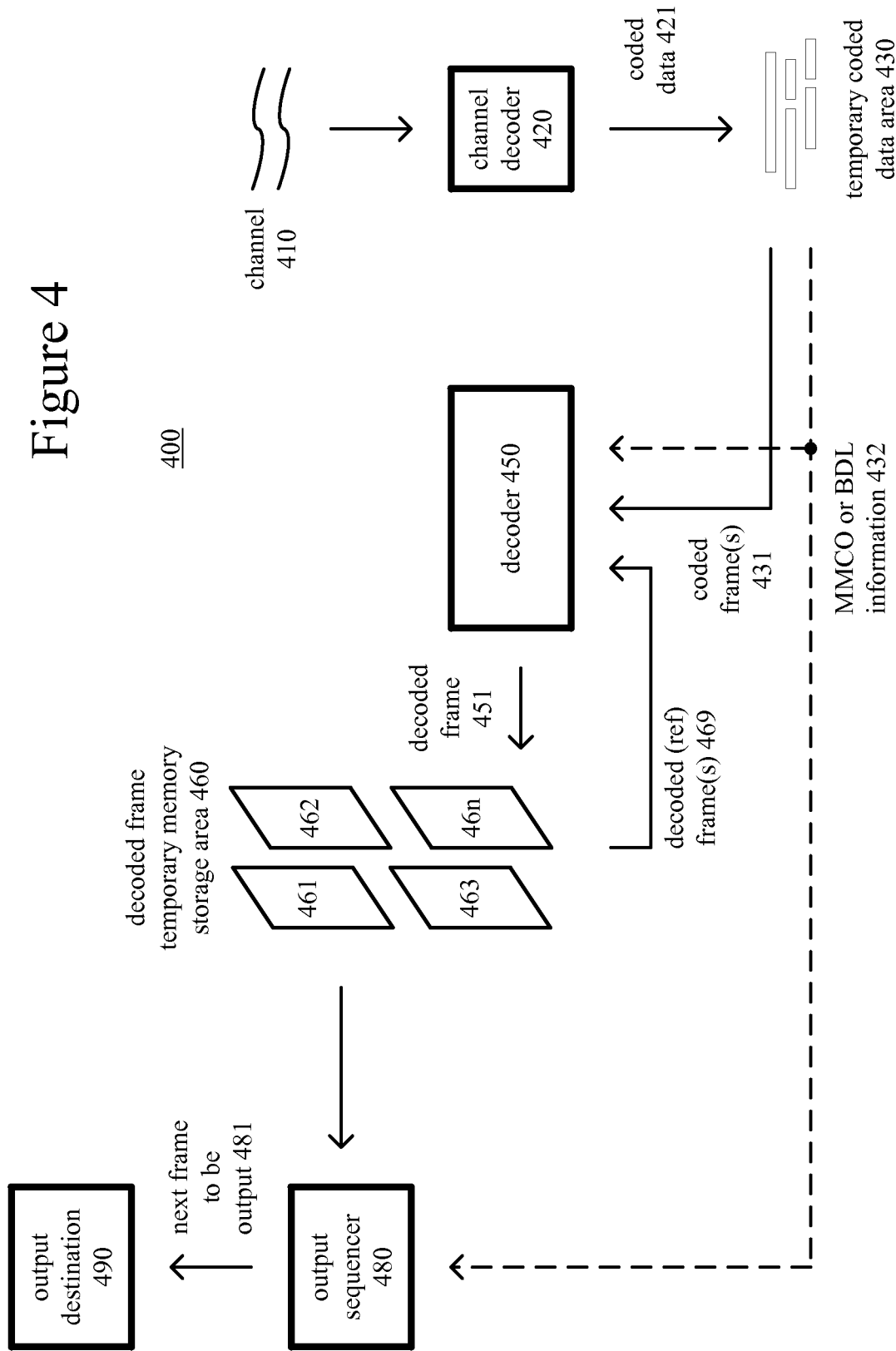
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). For such processing, the real-time communication tool (210) can recover encoded data from CPDB-formatted data. FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The encoding tool (212) can perform CPDB formatting of the encoded data from the encoder (220). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback. For such processing, the playback tool (210) can recover encoded data from CPDB-formatted data.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214) and/or network video transmission tools. FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can be formatted using CPDB as described in Section V.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding.

The encoder (340) encodes the selected frame (331) to produce a coded frame (341) and also produces memory management control operation ("MMCO") signals (342) or reference picture set (RPS) information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format or other format.

For example, within the encoder (340), an inter-coded, predicted frame is represented in terms of prediction from reference frames. A motion estimator estimates motion of macroblocks, blocks or other sets of samples of a source frame (341) with respect to one or more reference frames (369). When multiple reference frames are used, the multiple reference frames can be from different temporal directions or the same temporal direction. The motion estimator outputs motion information such as motion vector information, which is entropy coded. A motion compensator applies motion vectors to reference frames to determine motion-compensated prediction values. The encoder determines the differences (if any) between a block's motion-compensated prediction values and corresponding original values. These prediction residual values are further encoded using a frequency transform, quantization and entropy encoding. Similarly, for intra prediction, the encoder (340) can determine intra-prediction values for a block, determine prediction residual values, and encode the prediction residual values. In particular, the entropy coder of the encoder (340) compresses quantized transform coefficient values as well as certain side information (e.g., motion vector information, quantization parameter values, mode decisions, parameter choices). Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique. The entropy-coded data can be formatted using CPDB, as described in Section V.

Encoded data in different categories can be processed in parallel by different encoding units of the encoder (340). For example, different encoding units can encode content for different tiles of a source frame (331), producing encoded data for the respective tiles as different categories. Or, encoding units of the encoder (340) can be organized to produce encoded data according to other categories (e.g., wavefront entry points, PIPE partition categories). Or, the encoded data can be separated into different categories after encoding (e.g., with a single encoding unit), so as to facilitate parallel processing by decoding units at a decoder.

The coded frames (341) and MMCO/RPS information (342) are processed by a decoding process emulator (350). The decoding process emulator (350) implements some of the functionality of a decoder, for example, decoding tasks to reconstruct reference frames that are used by the encoder (340) in motion estimation and compensation. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . .

, 36*n*). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are also buffered in a temporary coded data area (370). The coded data that is aggregated in the coded data area (370) can contain, as part of the syntax of an elementary coded video bitstream, entropy-coded data formatted using CPDB as described in Section V. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream, in which case the channel encoder (380) can add syntax elements as part of the syntax of the media transmission stream, to accomplish formatting using CPDB. Or, the channel encoder (380) can organize the aggregated data for storage as a file, in which case the channel encoder (380) can add syntax elements as part of the syntax of the media storage file, to accomplish formatting using CPDB. Or, more generally, the channel encoder (380) can implement one or more media system multiplexing protocols or transport protocols, in which case the channel encoder (380) can add syntax elements as part of the syntax of the protocol(s), to accomplish formatting using CPDB. The channel encoder (380) provides output to a channel (390), which represents storage, a communications connection, or another channel for the output.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include entropy-coded data that have been formatted using CPDB as described in Section V.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream, in which case the channel decoder (420) can parse syntax elements added as part of the syntax of the media transmission stream. Or, the channel decoder (420) separates coded video data that has been aggregated for storage as a file, in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). If the coded data has been CPDB-formatted as part of a media transmission stream, media storage file, system protocol, transport protocol, etc., the channel decoder (420) can recover the coded data from the CPDB-formatted data.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) can contain, as part of the syntax of an elementary coded video bitstream, entropy-coded data that have been formatted using CPDB as described in Section V. The coded data (421) in the coded data area (430) can also include media metadata relating to the encoded video data (e.g., as one or more parameters in one or more SEI messages or VUI messages). In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms and motion compensation. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and makes the received encoded data available to an entropy decoder. The entropy decoder entropy decodes entropy-coded quantized data as well as entropy-coded side information, typically applying the inverse of entropy encoding performed in the encoder. Section V describes examples of entropy-coded data that has been formatted using CPDB. If coded data has been CPDB-formatted as part of the elementary coded video bitstream, the decoder (450) can recover the coded data from the CPDB-formatted data. A motion compensator applies motion information to one or more reference frames to form motion-compensated predictions of sub-blocks, blocks and/or macroblocks (generally, blocks) of the frame being reconstructed. An intra prediction module can spatially predict sample values of a current block from neighboring, previously reconstructed sample values. The decoder (450) also reconstructs prediction residuals. An inverse quantizer inverse quantizes entropy-decoded data. An inverse frequency transformer converts the quantized, frequency domain data into spatial domain information. For a predicted frame, the decoder (450) combines reconstructed prediction residuals with motion-compensated predictions to form a reconstructed frame. The decoder (450) can similarly combine prediction residuals with spatial predictions from intra prediction. A motion compensation loop in the video decoder (450) includes an adaptive deblocking filter to smooth discontinuities across block boundary rows and/or columns in the decoded frame (451).

Encoded data in different categories can be processed in parallel by different decoding units of the encoder (450). For example, different decoding units can decode content for different tiles of a frame. Or, decoding units of the decoder (450) can be organized to decode encoded data according to other categories (e.g., wavefront entry points, PIPE partition categories).

The decoded frame temporary memory storage area (460) includes multiple frame buffer storage areas (461, 462, ... , 46n). The decoded frame storage area (460) is an example of a DPB. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Category-Prefixed Data Batching of Entropy-Coded Data or Other Payload Data.

This section describes several variations of category-prefixed data batching ("CPDB"). The CPDB can be used to format entropy-coded data during encoding. Before corresponding decoding, a decoder or other tool recovers the entropy-coded data that have been formatted with CPDB. In particular, this section presents examples in which bitstream syntax, semantics, encoding and decoding for the HEVC standard (and certain proposed variations, extensions, etc. thereof) are modified to incorporate CPDB. The innovations described herein can also be implemented for other standards or formats.

Alternatively, instead of being used according to an elementary bitstream protocol, the CPDB described herein can be performed after encoding. For example, a multiplexing tool receives entropy-coded data from one or more encoders and performs CPDB to organize the data according to a storage format, transmission format, transport protocol or other protocol. Similarly, a demultiplexing tool can receive entropy-coded data that has been formatted with CPDB according to a storage format, transmission format, transport protocol or other protocol, then demultiplex the entropy-coded data and delivery it to one or more decoders for decoding.

In many of the examples presented herein, the payload data for a given batch is entropy-coded data. More generally, the payload data can be any type of data. The CPDB techniques described herein can be used in various scenarios in which a series of data having a length that is undefined or indeterminate in advance can be split into batches in different categories, where the batches are interleaved to reduce latency and/or promote parallelism. The different categories used for CPDB can correspond to different probability interval partitions for symbols (as in PIPE schemes), different wavefront entry points, different spatial areas of a picture (e.g., different tiles, different slices), or categories in some other categorization scheme for data.

CPDB can facilitate low-latency processing at an encoder and/or decoder and also help exploit opportunities for parallel processing. In example implementations, when using CPDB, parallel encoding units (for different categories) can emit data in the form of batches of CPDB-formatted data of any size at any time those batches are completed. At the decoder side, parallel decoding units (for different categories) can start operating at roughly the same time when data from different categories is interleaved in the bitstream, depending on the speed at which CPDB-formatted data arrives.

In example implementations, CPDB can offer the following benefits at the cost of relatively small bitrate overhead.
  Latency reduction at the encoder side and/or decoder side by exploiting opportunities for parallel processing.
  Very low buffering requirements at the encoder side and/or decoder side, by splitting payload data into relatively small batches of CPDB-formatted data.
  Improvement to decoder side parallelism, since parallel decoding units for different categories can start at roughly the same time.
  Start code scanning can be skipped on payload data of a batch of CPDB-formatted data, when certain rules are followed for CPDB.
  Removal of emulation prevention bytes can be skipped for a batch of CPDB-formatted data that is not consumed by the decoder, when the batch prefix accounts for the effects of emulation prevention bytes on size of the batch.

In various example approaches, CPDB can be used to interleave data from different categories. For spatial regions such as tiles, for example, a category can represent one or more tiles. For wavefront processing, a category can represent a wavefront. An encoder, multiplexing tool or other formatting tool can output a batch of data for a category by adding a batch prefix that indicates the category and size of the batch. The size of the batch can include any emulation prevention bytes added to the batch.

Figure 5:
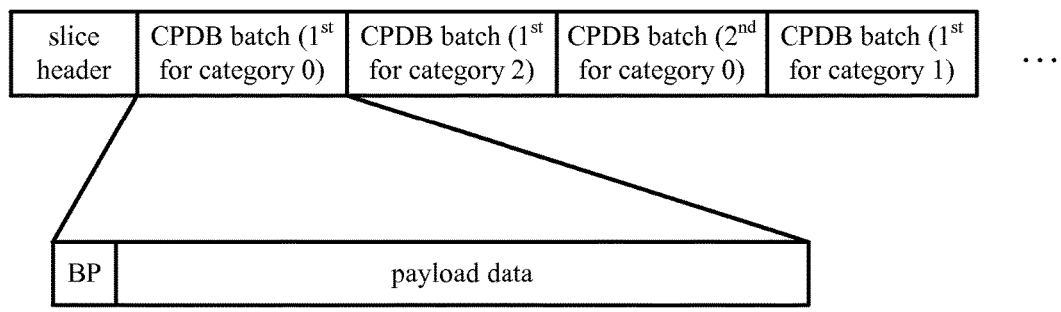
FIG. 5 is a diagram of a series of batches of CPDB-formatted data for a slice.

FIG. 5 shows an example series (500) of batches of CPDB-formatted data for a slice in example implementations. The slice header includes syntax elements such as control parameters for a given slice. The slice data for the slice is organized as batches of CPDB-formatted data. A batch includes a batch prefix ("BP") and payload data. Examples of syntax for BPs are given below.

As shown in FIG. 5, batches for different categories can be interleaved in the slice data. Parallel encoding units for different categories can output batches as soon as the batches are complete. Thus, batches for different categories need not appear in the order of category identifier. (In FIG. 5, a batch for category 2 precedes a batch for category 1.) Multiple batches for a given category can appear before the first batch of another category. (In FIG. 5, two batches for category 0 appear before the first batch for category 1.) When payload data are split into relatively small batches, latency and buffering requirements at the encoder side and decoder side can be reduced.

A. General Explanation, First Example Approaches to CPDB

This section describes some of the general principles and applications of CPDB according to a first set of example approaches. It then describes modifications of the formatting of entropy-coded bitstream data for certain variations that have been proposed for the HEVC standard. In particular, in some proposed variations to the HEVC standard, a probability interval partitioning entropy coding ("PIPE") or categorized V2V or V2F coding scheme has two basic modes of operation with respect to its categories of data to be carried: a "separated mode" and the "mixed mode." The separated mode (a) has a parallelism benefit relative to the mixed mode, but has increased overhead data requirements, (b) has substantial encoder and decoder data buffering capacity requirements, and (c) has relatively high end-to-end latency. This section describes an alternative approach to the separated mode and modified relationship between the separated mode and the mixed mode.

Many variations of PIPE and PIPE-like schemes have been evaluated as part of the standardization process for HEVC. See, e.g., JCTVC-F176 (describing a PIPE/V2F scheme); JCTVC-F268 (describing a PIPE scheme) as well as prior documents JCTVC-A032, JCTVC-A116 and JCTVC-D380; and JCTVC-C279 and JCTVC-A120 (describing another PIPE/V2V scheme).

1. Introduction and Description of PIPE Scheme.

In one example of a PIPE scheme proposed for the HEVC standard, a sequence of (generally non-binary) source data symbols is translated into "bin strings," and each "bin" of these bin strings is converted into a binary MPS/LPS indicator and an associated "probability interval partition" category. For example, the total number C of such categories may be equal to 10. The MPS/LPS indicators associated with each category are entropy encoded in a particular way that depends on their category. Specifically, ignoring the distinction between a bin and its MPS/LPS indicator value, they are encoded using a variable-to-variable length coding table for entropy coding the bins of each category. Then, there are two basic alternatives of how to organize the encoded data in the bitstream:

Separated mode, in which the encoded data bins for each particular category are processed in a separate batch. At the decoder side, each batch can be entropy decoded separately, although an additional sequential process translates the individual categorized data bins back into complete source bin strings which can then be translated back into M-ary source symbols. The separated mode facilitates parallel processing, since each batch can be decoded separately (prior to the sequential processing stage for reconstruction of bin strings).

Mixed mode, in which the encoded data for all categories are in a single batch of coded data that the decoder decodes bin-by-bin—sequentially determining the category for each bin that is to be decoded based on context-specific probability estimates.

To identify the location of each batch of categorized data for operation in the separated mode, the bitstream contains an index table that precedes the actual entropy coded data payloads. The index table contains offset pointers to identify the location and size of the batch(es) of data for each category.

If the amount of data in some category is judged to be excessive by the encoder (making this batch burdensome to decode using a single sequential decoding process by a decoder), "load balancing" can be used. In the load balancing scheme, a single batch of data for a category can be separated into multiple smaller batches. Each smaller batch can be decoded separately in a parallel fashion, thus improving parallelism for this stage of the decoding process. (Although again, an additional sequential process is used after this parallel step in order to reconstruct the bin strings from the decoded bins of the batches and sub-batches.)

When using the load balancing scheme, the index table includes offset pointers to identify the location of each batch for each category.

The index table used in the separated mode is an overhead data requirement, and thus it somewhat decreases compression effectiveness. It is helpful to reduce the amount of data used for the index table or other such overhead, particularly in proportion to the amount of entropy-encoded data to be transmitted.

The mixed mode does not use an index table. However, if the mixed mode is used, the decoding of the bins cannot be parallelized in the way that it can be for the separated mode. This can become burdensome to decode if the quantity of encoded data is large. Thus, there are benefits to using the separated mode when the quantity of encoded data is large, and to using the mixed mode when the quantity of encoded data is smaller.

Also, when operating in the separated mode, since the index table precedes the location of the data batches in the bitstream, the encoder first buffers all of the data batches before it can determine the values to put into the index table. The encoder cannot transmit the index table until it has determined those values. This buffering capacity and latency requirement can be inefficient in many scenarios. Moreover, because it can be efficient to use the separated mode when the quantity of encoded data is large, and to use the mixed mode when the quantity of encoded data is smaller, one implementation of the PIPE scheme could determine whether to use the separated mode or the mixed mode by buffering all of the data first, in order to determine whether the size of the data would be excessive for use of the mixed mode. Again, buffering all of the data before decoding can begin is inefficient in many scenarios.

2. CPDB, Generally, for First Set of Example Approaches

A signaling scheme using CPDB can replace the index tables in the PIPE scheme. This can reduce or even eliminate the buffering capacity and latency requirements of the PIPE scheme. CPDB can also reduce the quantity of overhead data so that the overhead is a small proportion of the overall encoded bitstream.

Figure 6:
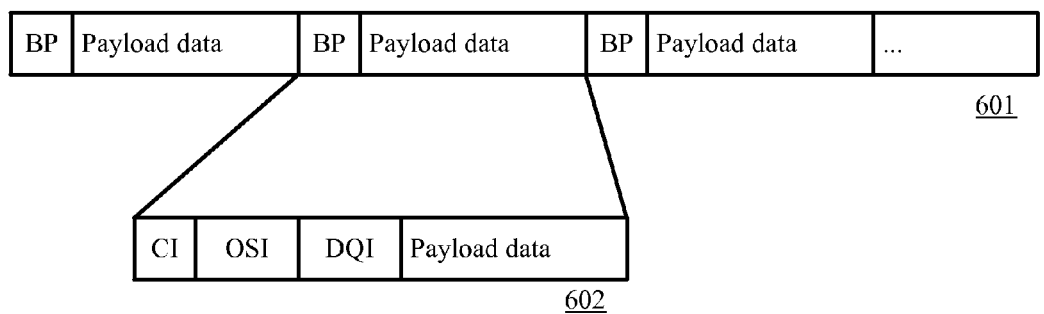
FIG. 6 is a diagram of a first example format for CPDB-formatted data.

For CPDB structuring of bitstream data, a batch of encoded data (except possibly the last batch) is prefixed by a batch prefix ("BP"). FIG. 6 shows a pictorial example of a data stream (601) that uses CPDB. The BP contains a category identifier ("CI") and may include some form of data quantity indicator ("DQI"). The DQI indicates to the decoder both the amount of data in the current batch and the location in the bitstream where the next batch of data can be found (simply by adding the indicated data quantity to the current location in the bitstream).

FIG. 6 also shows a pictorial example of one possible format for a batch (602) that uses a BP that contains a CI, a DQI, and other syntax indicators ("OSIs"). The OSIs may include any type of information. Various examples of the use of OSIs are provided below. Alternatively, the BP uses a different format (e.g., no OSI bits). The BP can have a fixed length or variable length, as described below.

In many of the examples presented herein, the length of a batch is measured in terms of bytes (e.g., 1024 bytes for a batch size). Alternatively, the length of a batch is measured in terms of bits, dwords (four bytes) or some other fixed-size units. Whatever the unit of measurement, DQI indicates the length of the batch in terms of those units.

3. Variations and Alternatives.

The syntax and semantics of the syntax elements used in CPDB can vary depending on implementation. In general, the various features described in this section can be used in combination or separately for purposes of CPDB.

For example, according to one feature, one special value of the CI is an indication that the current batch of data is a mixed-mode data batch rather than a separated mode batch of single-category data.

According to another feature, a syntax indication is provided in the BP to indicate whether any additional data batches will follow.

According to another feature, rather than sending all data in separated mode or in mixed mode, some data is sent in the separated mode and any remaining data is sent in the mixed mode.

According to another feature, some data is sent in the separated mode and any remaining data is sent in the mixed mode. A syntax indication is provided in the BP of the last batch of the data sent in the separated mode to indicate that it is the last such batch. No BP (or a BP without a CI) is used for the final, mixed-mode batch.

The BP can be a variable-length data structure consisting of one or two bytes. Or, the BP can be a fixed-length data structure.

According to another feature, one or more special batch sizes ("SBSs") are used by the encoder.

According to another feature, the encoder is prohibited from sending data batches in an order that differs (or differs excessively) from the order in which these data batches are used at the decoder side. This reduces decoder buffering capacity requirements.

According to another feature, the encoder is prohibited from sending an excessive quantity of small data batches, in order to reduce the decoder processing requirements for initialization of processing of each distinct data batch.

According to another feature, a "flush" operation may be applied to limit the buffering capacity or buffering latency for an encoder or decoder.

According to another feature, the BP is also used for sending other types of data or entropy coded data, such that a batch with its BP forms a structure similar to the NAL unit structure in the H.264/AVC standard. Alternatively, a single NAL unit structure (as described in the H.264/AVC standard) may contain multiple batches.

According to another feature, a BP is preceded by one or more types of special detectable patterns known as a start code prefix. Alternatively, the coding of the data within a batch is structured in a manner that prevents inadvertent emulation of a start code prefix by combinations of data values within the batch.

As noted, features of CPDB described herein can be used together in combination, or these individual features can each be used separately. More detail regarding some example embodiments is provided in the sections below.

4. Special Batch Size ("SBS") and Variable-Length BPs.

Consider an encoder that makes use of a special batch size ("SBS"), such as 1024 bytes. (The batch size could be specified in a way that the size includes some or all of the BP. Or, the batch size could be specified in a way that includes just the batch payload.) Such an encoder can operate in a manner that whenever the amount of data that it has buffered for some category reaches the SBS quantity, it emits a CPDB-formatted batch for that category. The DQI in this case may be a single flag with a first value (such as 1) indicating that the amount of data is equal to the SBS. In this case, the BP could use only a few bits of signaling information, consisting of the CI and the flag bit.

Once all data has been encoded (e.g., for a slice, frame or other portion of content), any remaining batches (of size smaller than the SBS) can be sent. In these batches, the flag bit can be set to a second value (such as zero), and an additional data length parameter (fixed-length coded or variable-length coded) can be included in the BP to indicate the actual size of the batch.

For data alignment convenience, it can be helpful for data to appear at byte-aligned locations in the bitstream. Thus, in such a scheme, it may be convenient for the BP of a batch to have one of just two specific lengths—e.g., one byte when emitting a data batch of size SBS, and two bytes when emitting a data batch of some other size. Moreover, the use of some form of alignment padding at the end of payload data (e.g., as used for RBSP trailing bits in H.264/AVC syntax) may be helpful to include with the data payload, so that the batch size is always an integer number of bytes.

In such a scheme, the total quantity of data overhead would be small for typical values of SBS, the batching requirements on the encoder would be reduced, and the latency of the encoder throughput would be reduced. In particular, the encoder buffering capacity and latency could be made as small as approximately only one or two SBS of data per category. If the encoder is prohibited from sending batches in an order that is substantially different than the order in which they are used by the decoder, the decoder buffering capacity would be limited to that quantity. (Some buffer "flush" latency-limiting capability may be applied in order to impose such a batch order constraint.) If the length of BP per batch is one byte or two bytes, the total quantity of data overhead when operating in separated mode would be approximately one byte per batch of size SBS, plus two bytes each for the headers of one "remainder" batch for each category. This would be a total overhead quantity of approximately $2*C+n$ bytes, where n is the number of batches with size SBS. Whenever n is reasonably large (and SBS has a value such as 1024 bytes), this would become a very small percentage of the total data. It may be possible to further reduce this number by using a syntax indication (e.g., a special value of the CI, or a flag in the final occupied BP), as an indication of whether any additional data batches will follow in the bitstream.

The value of the SBS (e.g., 1024 bytes) could be represented using syntax within the header level of the bitstream (e.g., in a sequence parameter set or picture parameter set). Alternatively, the SBS could be established by other means (e.g., by out-of-band negotiation, or by simply specifying SBS as a fixed design parameter).

5. Separated Mode with Mixed Mode Remainders.

In some examples, rather than sending all data in separated mode or in mixed mode, some data is sent in the separated mode, and any remaining data is sent in the mixed mode. This can reduce or eliminate sending small "remainder" batches for each individual category.

Assuming that the SBS size is reasonably large, the 1-byte overhead per BP of batches of SBS size is negligible as a percentage of the total bitstream size, so the total overhead quantity is dominated by the size of the remainder batch overhead, which is $2*C$ when using separated mode remainders—two bytes per category. (Of course, this quantity of data only matters when n is very small—i.e., when the total amount of data to be encoded is small.) When the encoder uses a mixed-mode remainder batch, this cuts the fixed cost of $2*C$ as well—reducing it from $2*C$ to just 2, for a single mixed-mode batch prefix.

6. Potential Elimination of the Final CI or BP and all DQIs.

In other examples, the final CI is eliminated, or even the entire final mixed-mode BP. For example, if a "next batch is last" flag is included in each non-final BP, and the last batch is always a mixed-mode batch, the final BP can lack a CI.

Or, if some other method is available to determine where the encoded data payload of the final batch ends, then the final mixed-mode batch is able to include no BP at all. Examples of such other methods (to determine where the data payload of the final batch ends) include the following.

When a packet size indication exists (e.g., for a higher level framing packet), the quantity of remaining data can be computed by subtracting the quantity of other data from the quantity of total data provided in the packet size indication.

The end of the mixed mode batch can be framed by a mechanism such as the RBSP trailing bits and byte stream NAL unit structure specified in the H.264/AVC standard.

An "end" indicator can be encoded within the final mixed mode batch, to indicate in an end-of-batch status.

Information determined by parsing the encoded data can be sufficient to determine when to stop decoding—e.g., by counting the number of decoded macroblocks, and stopping when that number reaches the total number of macroblocks for the coded picture.

Moreover, if all batches other than the final batch have the size of the SBS, there may be no need for DQIs of any sort in BPs for either the separated mode batches (since these will always have the size of the SBS) or the final mixed mode batch (since these will contain all remaining data with a quantity that may be possible to determine by such other methods).

7. Reducing Size of Mixed Mode Remainder Batches Using Small DQIs on Separated Mode Batches.

In some variations, more than one SBS value could be used, with some indication of which of them applies.

If the encoder is enforcing some maximum batch size M, then the amount of encoded data buffered within the encoder for inclusion in a final mixed mode batch could be approximately M*C (if almost a full batch remains for each category), which is much larger than M. It may be efficient in some scenarios to reduce this maximum data quantity for the final mixed mode batch.

One way to do this would be to have more than one SBS. For example, the DQI on a separated mode batch could consist of an N bit value K. For example, N could be 3 or 4. With the DQI encoded in this way, both the DQI and the CI might fit into a single byte BP (perhaps with a couple of extra bits to spare for other purposes), and the size of the final mixed mode remainder batch would never be larger than approximately $C*M/2^N$. For example, if C=10 and N=4, the size of the final mixed mode batch could always be kept substantially smaller than M. (More specifically, the size of the final mixed mode batch would be kept less than or equal to approximately $5/8^{th}$ of M).

8. Start Code Emulation Prevention in First Example Approaches.

Start code emulation prevention (e.g., as currently specified for the H.264/AVC standard) can be applied to the entire sequence of coded information. Alternatively, it may be possible to avoid the need for this within the entropy-coded data segments, for example, as follows:

Formatting the BP to avoid it being involved in a start code emulation—e.g., by ensuring that no byte of the BP can be equal to 0, and Formatting the variable-to-variable coding tables for the entropy coding of each category in a way that avoids using all-zero codewords. For example, individual 0 and 1 bits that form the branching points of a prefix code can be swapped without effect on the code efficiency. If a code has an all-zero codeword, bits can be swapped from the root to the leaves, following the rule that the branch with the most leading zeros should be the branch with the longest codeword. If this process ends with a leaf node that is an all-zero codeword, a single 1 bit can be appended to this codeword with minimal impact on compression performance (since a long codeword would be a low-probability codeword in a well-designed code). The resulting code would have no all-zero codewords and very similar compression performance. Since there are at least 22 consecutive zero bits before the H.264/AVC start code emulation prevention process is invoked, this would prevent issues as long as the total number of trailing zero bits that can precede a codeword plus the total number of leading zero bits in the codeword is less than 22.

Ensuring start code emulation prevention in any cases where trailing data may be present in any bits that are inserted in the bitstream for other purposes—e.g., for purposes of establishing byte alignment.

By following such guidelines, application of start code emulation prevention to the entropy coded data and associated BP header data can be avoided.

B. Second Example Approaches to CPDB

For a second set of example approaches to CPDB, this section describes modifications of the formatting of entropy-coded bitstream data for the HEVC standard for use with wavefront decoding or tiles. The second approach applies many of the CPDB concepts described above (from the first set of example approaches) as applied to PIPE/variable-to-variable entropy coding. These CPDB concepts can also be applied to other schemes in which a bitstream indicates different categories of data. More generally, the CPDB concepts introduced herein can be applied to any scheme that conveys different categories of data. For example, features of the CPDB concepts disclosed herein can be used to combine the data from different sub-streams when using wavefront coding or to combine the data from different tiles when using tiles.

In an HEVC draft specification for wavefront processing (see the documents JCTVC-F274 and JCTVC-F275), an index table is used in the slice header to identify the location of the starting point of the data for each wavefront entry point. The use of these indices increases the delay and memory capacity requirements at the encoder, to batch all of the data before output of the index table and the subsequent sub-streams. The use of these indices also increases the delay and memory capacity requirements at the decoder, to batch input data in some sub-stream category while waiting for the data to arrive in some other category.

Another element of the HEVC draft specification involves spatial areas that are referred to as tiles (see the document JCTVC-F335) and spatial areas that are referred to as slices. As envisioned, the encoding processes for different tile regions of a picture are performed in parallel with each other, and the encoding processes for different slice regions of a picture may also be performed in parallel. The different spatial regions corresponding to different tiles or slices may be regarded as different categories of data to be conveyed in the encoded data, in a similar manner as for data having different wavefront entry points.

This section describes example approaches to chopping up different categories of data into batches, and prefixing each batch with a batch type identifier and a batch length value. The different categories of data can then be interleaved with each other in relatively-small batches instead of being buffered for serial storage into the bitstream data. Since the encoder can emit these batches of data as they are generated, and parallelized decoders can potentially consume them as they arrive, the delay and buffering requirements are reduced.

1. CPDB, in General, for the Second Example Approaches.

Rather than using the current index table approach, in the second example approaches, the different categories of data are chopped up into batches, and a batch is prefixed with a batch type identifier and a batch length value. The different categories of data can then be interleaved with each other instead of being placed sequentially into the bitstream data.

A batch of encoded data is prefixed by a BP. The payload data for the batch then follows the BP, as shown in the stream (601) in FIG. 6. The BP for a batch contains a CI, a DQI, and possibly other syntax elements. The CI identifies the type of data (e.g., the wavefront entry point, tile or tiles), and the DQI indicates the amount of data in the current batch. The next batch of data can then be found by adding the indicated data quantity to the current location in the bitstream.

2. Special Batch Size ("SBS") and Variable-Length BPs.

A CPDB scheme can make use of a SBS, such as 1024 bytes. An encoder can then operate in a manner such that whenever the amount of data that it has buffered up for some category reaches the SBS quantity, it emits a batch of CPDB-formatted data for that category. The DQI in this case may be a single flag for which a first value (such as one) indicates that the amount of data is equal to the SBS. In this case, the BP would require only a few bits of signaling information, basically consisting of the CI and the flag bit.

Once all data has been encoded, any remaining batches of size smaller than the SBS can be sent. In one of these remainder batches, the flag bit can be set to a second value (such as zero), and an additional data length parameter can be included in the BP to indicate the actual size of the batch.

In particular, in example implementations for the second example approaches, a BP can use the following syntax element structure:

A few CI bits to indicate the type of data in the batch.
A flag bit that indicates whether or not the batch size is equal to the SBS (e.g., 1024 bytes).
  When the flag bit is equal to 1, indicating a batch size equal to the SBS value, the BP contains only a single byte with the above contents.
  Otherwise, the remaining bits of the first byte and other bits of the subsequent byte are combined to form a fixed-length code (FLC) that indicates the quantity of subsequent data.
A syntax indicator bit can be used to indicate whether or not additional batches will follow within the same category. Alternatively, or in addition to this type of syntax indicator bit, another syntax indicator bit can be used to indicate whether or not additional batches will follow in any category, or in any category other than the current category.
For handling non-integer numbers of bytes of payload data, for example, when the current batch is indicated to be the last batch in the category, the final byte can contain H.264/AVC-style byte-alignment padding to enable determining the position of the last bit of the payload bit string. Alternatively, the DQI could express the data payload quantity directly in units of bits rather than in units of bytes. However, starting each batch on a byte boundary simplifies implementation in many respects.

Possibly, a couple of bits for other syntax elements (OSIs) could also be included, for other various purposes. Such purposes could be established to be defined later or defined by a user, although space for these other syntax elements could be reserved.

3. Start Code Emulation Prevention for Second Example Approaches.

Start code emulation prevention (e.g., as currently specified for H.264/AVC) can be applied to the entire sequence of coded information. Or, start code emulation prevention processing can be avoided as described for the first example approaches.

C. Third Example Approaches to CPDB

In a third set of example approaches, when CPDB is used to identify different categories of data, an encoder and decoder benefit by having less buffering requirements and lower delay. Furthermore, when applicable, if start code emulation prevention is accounted for in an indicated payload size, a decoder can skip scanning for start codes within a batch of CPDB-formatted data. In addition, a decoder that decides to skip a category can avoid emulation prevention byte removal on the data that will be skipped.

1. Example Schemes for Batch Header Bytes.

As explained above, CPDB can involve packaging the data from different categories into a single stream. A data stream constructed using CPDB comprises one or more units or batches of CPDB-formatted data. As illustrated in FIG. 6, a batch of CPDB-formatted data (e.g., batch (602)) starts with a BP representing information about the data followed by the payload data itself.

Figure 7:
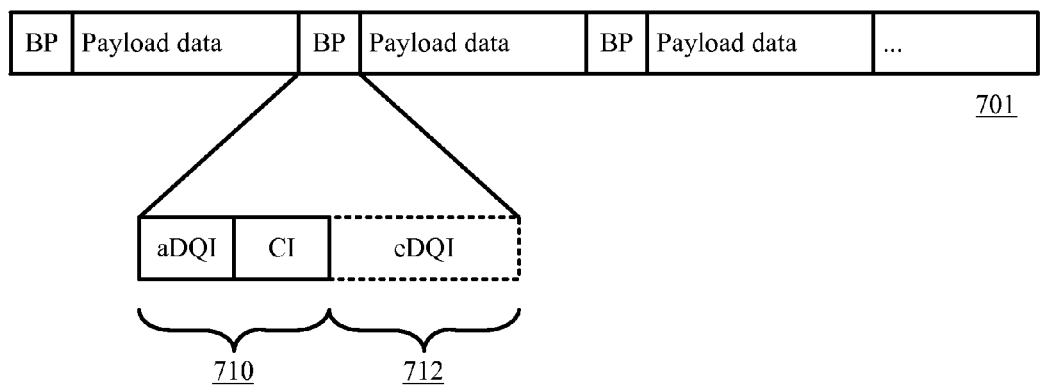
FIG. 7 is a diagram of a second example format for CPDB-formatted data.

In one example CPDB scheme of the third approaches, the BP is either one or two bytes long and comprises a DQI and a CI. FIG. 7 is a block diagram (700) of a bitstream (701) illustrating the example CPDB scheme. In the bitstream (701), a first byte (710) of the BP for a batch comprises an abbreviated DQI (shown as "aDQI") and a CI. The abbreviated DQI (3 bits in an example implementation for the third approaches, though other sizes are possible) occupies the most significant bits in the byte (710) and the remaining bits are used by the CI (5 bits in the example implementation, though other sizes are possible). The value of aDQI indicates whether the batch has a special batch size ("SBS") or custom batch size ("CBS"). When the batch has a SBS, the value of aDQI also specifies the value of the SBS. A second byte (712) of the BP for the batch, when present, represents a DQI extension (shown as "eDQI"). The abbreviated DQI and DQI extension (when present) together form the DQI. However, the eDQI is only present when the aDQI indicates that it is present.

In the example CPDB scheme, the CI bits identify the category of the data, and the DQI gives information on the size of the payload data. Furthermore, in order that the first byte (710) of the BP reset any emulation prevention search state, the first byte (710) can be constrained to have a value greater than 0x03. In particular, the value of abbreviated DQI can be constrained such that it is never allowed to be equal to "0" (a bit pattern of '000'). As a result, when the abbreviated DQI uses the 3 most significant bits in the byte, the first byte (710) is always greater than or equal to 0x20.

The following table illustrates the payload sizes signaled by the abbreviated DQI according to the example implementation. The values in the following table are not to be construed as limiting, as other payload sizes can be signaled, or the illustrated payload sizes can be designated by different values of the abbreviated DQI.

| Abbreviated DQI (value) | Abbreviated DQI (bit pattern) | SBS or CBS? | Size (e.g., in bytes) |
|---|---|---|---|
| 0 | '000' | Not Applicable | Not Applicable (since this value is not allowed for abbreviated DQI) |
| 1 | '001' | SBS | MAX_BATCH_SIZE |
| 2 | '010' | SBS | MAX_BATCH_SIZE >> 1 |
| 3 | '011' | SBS | MAX_BATCH_SIZE >> 2 |
| 4 | '100' | SBS | MAX_BATCH_SIZE >> 3 |
| 5 | '101' | SBS | MAX_BATCH_SIZE >> 4 |
| 6 | '110' | SBS | MAX_BATCH_SIZE >> 5 |
| 7 | '111' | CBS | Indicates that another byte follows that represents a DQI extension which indicates a size value in the range [1, 255] |

According to the table above, a second byte representing a DQI extension is included as part of the BP when aDQI is equal to 7. In the example, the second byte is a fixed length code indicating the size of the payload in the range of 1 to 255 (inclusive of the end points in the range). Furthermore, the second byte representing the DQI extension is non-zero so that emulation prevention checks will skip this byte, and the emulation prevention search state is reset.

In the example, when the abbreviated DQI is equal to 7, the batch is a "custom batch" and its size is a CBS. Here, the abbreviated DQI signals a range of sizes for the CBS, but the actual size for the CBS is signaled by the second byte (712) representing the DQI extension. In this instance, BP is two bytes long and comprises the first byte (710) and the second byte (712). When the abbreviated DQI is a value from 1 to 6, the batch is a "special batch" and its size is a SBS, since the abbreviated DQI signals a specific SBS size (and not a range of sizes), and a DQI extension is not signaled. In this instance, the BP is one byte long and comprises only the first byte (710).

The value of MAX_BATCH_SIZE depends on implementation. For example, MAX_BATCH_SIZE is set to 8192, which implies that the SBSs are 8192, 4096, 2048, 1024, 512 and 256 for abbreviated DQI values from 1 to 6, respectively. The MAX_BATCH_SIZE can vary, however, from implementation to implementation, as can the number of possible values for SBS. Furthermore, when the lowest SBS is 256, the CBS can be in the range of 1 to 255 (inclusive of the end points in the range). Or, if the lowest SBS is higher (e.g., 512, 1024, 2048), the CBS can be in the range of 1 to 255 times a defined size such as 2, 4, 8 and so on. The range of the CBS can vary from implementation to implementation.

In the example implementation for the third approach, there is no restriction on when a special batch can be used or when a custom batch can be used. These two types of batches can be mixed in any way in the stream. This offers the encoder significant flexibility to trade-off between latency and overhead. An encoder can emit a batch whenever the encoder has data ready to send in a particular category. In this way, batches are emitted until the data from all categories has been exhausted for a given slice or other portion of content being encoded.

2. Start Code Emulation Prevention for Third Example Approaches.

In the third example approaches to CPDB, a BP is formatted such that it avoids start code emulation prevention byte insertion (e.g., as currently specified for the H.264/AVC standard). The abbreviated DQI does not use the bit pattern 000, which means the first byte of a BP is always greater than or equal to 0x20. Moreover, the second byte of the BP, representing the DQI extension (when present), is never equal to 0, which avoids emulation of an 0x00 byte of a start code.

In the third example approaches, the size indicated in the BP can refer to the size of the payload data after emulation prevention has been applied to payload data. This feature is useful for decoders that do not use all categories of data present in a stream. It can also be useful for quickly passing the data to some other processing stage without decoding it (and without scanning through the payload data to account for start code emulation prevention). For example, a batch of CPDB-formatted data could be passed to a hardware accelerator element that will decode it, or stored in a file storage format such as the ISO base media file format. When a decoder finds a data batch that it does not intend to use after reading the BP, the decoder can skip the stream forward by the number of bytes indicated for the payload. The decoder does not remove emulation prevention bytes (in the unused batch) to determine where the next batch starts. In addition, the decoder does not have to scan batches for start code prefixes, since a start code prefix will not occur within payload data of a batch (due to start code emulation prevention processing by an encoder).

If the size indicated in the BP refers to the size of the payload data after any emulation prevention bytes have been inserted, the encoder, multiplexing tool or other formatting tool should account for the impact of emulation prevention on payload data to construct the batch. The formatting tool can determine the impact of emulation prevention on payload data using a variety of techniques, a few of which are discussed below.

According to a first example technique, the formatting tool applies emulation prevention on the payload data as it is inserting the payload data into the data batch. This ensures that the batch does not emulate the special codes that are prevented when emulation prevention is performed (e.g., the BP is guaranteed not to emulate special codes and guaranteed to reset the emulation prevention state).

When a data batch of size CUR_SIZE is being constructed in this manner (in which emulation prevention is applied to the payload as it is inserted into the data batch) and the last byte at position CUR_SIZE-1 (assuming byte positions are indexed from 0 to CUR_SIZE-1) is yet to be filled, it is possible that the bytes at position CUR_SIZE-3 and CUR_SIZE-2 are both equal to 0x00. (A start code, in the example implementation, begins with two 0x00 bytes.) In this case, since there is only space in the batch for one more byte to be filled, the formatting tool can add an emulation prevention byte (e.g., 0x03) (or, a byte greater than 0x03, such as 0x04) at position CUR_SIZE-1 to help ensure that the size remains what it was intended to be for the batch. For example, the formatting tool does not fetch the next byte from the data-batch category for insertion into the data batch, since this byte could be less than or equal to 0x03, and hence create a sequence 0x000000, 0x000001, 0x000002 or 0x000003 that start code emulation prevents. Instead, the formatting tool inserts a byte (e.g., 0x03 or 0x04) for the last byte of the CPDB batch. Otherwise (if the formatting tool fetches the next byte from the data-batch category for insertion into the data batch), the next byte from the data-batch category could be less than or equal to 0x03, thereby causing the need for an additional emulation prevention byte, for which there is no space in the batch.

Alternatively, instead of checking the two bytes that are third and second from the end of the batch, the formatting tool can fetch the extra byte of payload data and checks its value. The formatting tool then inserts an EPB (e.g., equal to 0x03) only if the next byte of the payload would be less than or equal to 0x03. If the formatting tool inserts the EPB, then the last byte of actual payload data (the extra byte that was fetched) can be inserted into the next batch. Or, if the batch size is a CBS, then the formatting tool can just increase the batch size in these instances to include the extra byte resulting from insertion of the EPB, unless the CBS is already at the maximum value of the range allowed (in which case the techniques described above can be used and/or the CBS can be converted to an SBS).

Further, at the decoder side, the module that removes emulation prevention bytes should remove the one added above as well. In other words, the module searches for this special pattern of two zero bytes and emulation prevention byte at the end of the data payload, and removing the emulation prevention byte if present.

According to a second example technique, the formatting tool calculates an expected position (e.g., a position indexed from 0 within the payload) for each byte inserted to the payload by simulating the process of emulation prevention on the payload generated so far. This computation can occur as the bytes are inserted to the payload. In doing so, the formatting tool accounts for positions at which start code emulation prevention bytes will later be added in the process of emulation prevention. If the data batch being constructed is of size CUR_SIZE, when the formatting tool accounts for expected position CUR_SIZE-1 (either a byte is inserted into payload or an emulation prevention byte will be added later), the construction of the batch is complete. When the formatting tool sends the stream through an emulation prevention module at a later stage, emulation prevention bytes will be inserted in the payload data as needed, such that the size of the payload after emulation prevention matches the size signaled in the BP. For example, if the size of the current batch is 1024 bytes, and the formatting tool identifies five positions at which start code emulation prevention bytes will be added, the data payload includes 1019 bytes of actual data, and the later emulation prevention process will insert the five emulation prevention bytes at appropriate locations.

When a data batch is being constructed in this manner (in which a formatting tool accounts for the effects of emulation prevention that will be applied to the entire stream later), and when the formatting tool accounts for expected position CUR_SIZE-1, it is possible that the bytes at expected position CUR_SIZE-3 and CUR_SIZE-2 are both equal to 0x00. In this case, since there is only space for one more byte to be filled (and the final byte could create a problematic three-byte pattern if it is 0x00, 0x01, 0x02, or 0x03, thereby creating a pattern that triggers the addition of a start code emulation prevention byte and causes the data payload to exceed the signaled size by one byte), the formatting tool can add a filler byte (e.g., any byte value larger than 0x03) to explicitly ensure that an emulation prevention byte will not be added here. Otherwise, the size of the payload data cannot be guaranteed to be CUR_SIZE after emulation prevention. In this case, the decoder detects this condition in the payload data (i.e., detect that the third and second to final bytes are each 0x00) and discards the filler byte. In addition, the decoder can confirm that the value of the filler byte read from the stream matches the expected value, as an error checking condition to determine a corrupt bitstream or to determine errors in decoder implementation. The filler byte can be 0x04; however, as mentioned above, any value above 0x03 can be used as a filler byte. If the batch size is a CBS, then the formatting tool can just increase the batch size in these instances to include the extra byte resulting from insertion of the EPB, unless the CBS is already at the maximum value of the range allowed (in which case the techniques described above can be used and/or the CBS can be converted to an SBS).

3. Mapping Actual Data Categories to Data-Batch Categories.

In the third example approaches, the categories used for data batching can be mapped to the actual data categories in a one-to-one or one-to-many manner. The actual data categories can correspond to different probability interval partitions for symbols (as in PIPE schemes), different wavefront sub-streams, different spatial areas of a picture (e.g., different tiles, different slices), or categories in some other categorization scheme for data. The actual data categories can exceed the maximum number of data-batch categories represented by CI (which, for example, can represent a maximum of 32 data-batch categories using 5 bits). The mapping from the actual data categories to the data-batch categories depends on the number of the actual data categories and the maximum number of data-batch categories.

The number of batch categories affects the degree of parallelism at which a decoder can operate. In general, when more batch categories are used, more parallelism is enabled at the decoder. Tiles can also enable encoder-side parallelism. In fact, the desired level of parallelism in the use of tiles can be higher at the encoder than at the decoder, especially for real-time encoding scenarios, considering the computational complexity of encoding. For at least some types of payload data (e.g., tiles), the number of batch categories can be set to be smaller than the number of payload data categories.

When the number of payload data categories is higher than the number of possible values for CI, payload data categories can be grouped into batch categories. In one example method, a mapping factor $N_{map}$ is computed, where:

$$N_{map} = \text{ceil}\left(\frac{\text{number of actual data categories}}{\text{maximum number of data} - \text{batch categories}}\right).$$

Then, the actual data categories from index 0 to $N_{map}-1$ are placed into data-batch category 0, actual data categories from index $N_{map}$ to $2*N_{map}-1$ are placed into data-batch category 1, actual data categories from index $2*N_{map}$ to $3*N_{map}-1$ are placed into data-batch category 2, and so on. For example, if the data categorization is based on tiles, there are 40 tiles, 32 possible values for CI, and indices start from 0, then the data from tile 0 and tile 1 goes into data-batch category 0, data from tile 2 and tile 3 goes into data-batch category 1, and so on such that data from tile 38 and tile 39 goes into data-batch category 19.

This results in a mapping of data-batch categories to actual data categories according to a one-to-many relation. In cases in which the number of actual data categories is less than the maximum number of data batch categories, the value of $N_{map}$ is 1, and each data-batch category can map to a single actual data category in a one-to-one relation.

For some types of payload data (e.g., wavefront entry points), there is typically a one-to-one mapping from payload data category to batch category.

4. Variations on Data-Batch Category Signaling.

Alternatively, even when the number of payload categories is less than or equal to the number of possible values for CI, categories can be combined for use as a single category for CPDB in order to reduce BP overhead. For example, the CI is used to signal the smallest value for data-batch category packaged in the batch, but allows for any data-batch category with an index greater than or equal to the CI to be packaged in the batch. For example, a batchwith a CI equal to "0" can contain data from any data-batch category (since all data-batch categories have indices greater than 0). As another example, a batchwith a CI equal to "5" can contain data from all data-batch categories having CI of 5 and above.

As yet another example, if there exist data-batch categories from 0 to 19 in use, the categories can be signaled using fewer than all possible individual signals for the 20 possible categories. For instance, just 4 different values for CI instead of 20 different values for CI can be used. A batch with CI equal to 0 can contain data from data-batch categories 0 to 4; a batch with CI equal to 5 contains data from data-batch categories 5 to 9; a batch with CI equal to 10 contains data from data-batch categories 10 to 14; and a batch with CI equal to 15 contains data from data-batch categories 15 to 19. Alternatively, the CI is used to signal the greatest value for data-batch category packaged in the batch and allows for any data-batch category with an index less than or equal to the CI to be packaged in the batch.

5. Combining Consecutive Data-Batch Categories.

Thus, for some types of payload data (e.g., tiles), consecutive categories can be combined for use as a single category for CPDB in order to reduce BP overhead. In such a case, the smallest data-batch category among the data-batch categories that are combined together can be used to identify the combined data-batch category and used in the determination of CI. For example, for data in 32 categories, data-batch categories 0, 1, 2 can be combined such that the data in these data-batch categories is sequentially concatenated and packaged into one or more batches with CI equal to 0; similarly, data-batch categories 3, 4, 5, 6, 7, 8 can be combined, and data from these data-batch categories can be packaged into one or more batches with CI equal to 3; and all remaining data-batch categories (data-batch categories 9 to 31) can be combined and data from these data-batch categories can be packaged into one or more batches with CI equal to 9.

6. Arranging Data Categories.

In some CPDB implementations, when more than one data category is present in a data-batch category (or in a combined data-batch category), the batch (or batches) for that data-batch category are arranged in the bitstream for the current slice (or other spatial area or portion) such that all payload data for a data category with index $T_i$ appears before any data for a data category with index $T_j$ where $T_i < T_j$. In other implementations, the batch (or batches) are arranged in the opposite order (that is, payload data for a data category with index $T_j$ appears before any data for a data category with index $T_i$ where $T_i < T_j$).

7. Signaling Overall CPDB Usage.

In addition to the different levels of flexibility allowed by the CPDB, the entire usage of CPDB can be switched on/off either implicitly or explicitly. For instance, CPDB can be implicitly switched "on" for a slice (or other spatial area or portion) when the number of data-batch categories used within that slice (or other spatial area or portion) is greater than "1"; otherwise, CPDB can be switched "off" for that slice (or other spatial area or portion). Or, explicit signaling can embed a flag in the bitstream that signals whether to use CPDB or not, either in the slice header, the picture parameter set, the sequence parameter set, or in locations where such high-level configuration settings are signaled.

8. Signaling Dependencies.

Depending on what the actual data categories are, different data-batch categories can have dependencies upon each other in order for the decoder to decode the payload data. For example, in the case of wavefronts, in some cases, data from a sub-stream cannot start being decoded until some data belonging to the previous sub-stream has been decoded (e.g., the first two LCUs of the previous LCU row should have been decoded from the previous sub-stream before the data corresponding to the first LCU in the current LCU row can be decoded from the current sub-stream). Thus, in certain implementations of CPDB, constraints are placed such that batches from different data-batch categories are ordered so that the decoder can decode all the batches in a serial manner without having to wait for data from a later batch.

D. Example Bitstream Syntax and Semantics

FIGS. 8a-8c show syntax elements for batches of CPDB-formatted data for a slice in an example implementation for slice data. A batch of CPDB-formatted data for a slice is represented with a syntax structure that contains an integer number of bytes, and that has a prefix and a payload. The prefix indicates the category of the data and size of the payload. The payload contains slice data for the category indicated in the prefix. An ordered CPDB payload ("OCP") is a syntax structure that contains an integer number of bytes, which is formed from the payload data of batches of CPDB-formatted data within a slice such that all payload data from category i appears before the payload data from category j when i<j. Furthermore, the payload data within a category appears in the order in which the batches from that category appeared in the raw byte sequence payload ("RBSP").

FIG. 8a shows bitstream syntax (801) for a slice data RBSP. For each of 32 categories, the number of bytes of slice data in the category (NumBytesInCategory) is set to zero. Then, as long as there is more slice data (more_rbsp_data), another CPDB unit is parsed from the bitstream. FIG. 8b shows bitstream syntax (802) for a CPDB unit. For a CPDB unit, an abbreviated_data_quantity_indicator syntax element (example of aDQI) and category_identifier syntax element (example of CI) are parsed from the bitstream. The three-bit aDQI syntax element specifies whether the batch uses a SBS or a CBS. When the batch uses an SBS, aDQI also specifies the value of the SBS, as shown in the table above. The maximum SBS size is 8192 bytes. The bit pattern 000 is not allowed for aDQI. The five-bit CI syntax element specifies the category of data present in the batch. The CI syntax element can have a value ranging from 0 to 31, inclusive. If the value of the aDQI syntax element is 7, the data_quantity_indicator_extension syntax element (example of eDQI) is present in the bitstream. The eight-bit eDQI syntax element specifies the value of CBS, when the batch uses a CBS. The eDQI syntax element, when present, can have a value ranging from 1 to 255, inclusive.

Next, for the bytes of the CPDB unit, any emulation prevention bytes are skipped over and any filler bytes are removed using the conditions shown in FIG. 8b. The values of bytes of payload data are written to the ocp_ss_byte structure for a given category (indicated by the CI syntax element), with the counter NumbBytesInCategory getting incremented for the given category. The structure ocp_ss- _byte[i][j] is the j$^{th}$ byte for category i when the payload data from all batches for category i in the current slice have been concatenated in the order received in the slice data RBSP. The element cpdb_filler_four_byte is a byte equal to 0x04, after two 0x00 bytes. When a cpdb_filler_four_byte is present in a CPDB unit, it is discarded.

Returning to FIG. 8a, after the last CPDB unit for a slice has been parsed, the routine cpdb_merge writes the bytes of payload data to the structure ocp_byte, which represents the ordered CPDB payload. In FIG. 8c, the structure ocp_byte[i] is the i$^{th}$ byte in the OCP. Thus, the OCP structure is an ordered sequence of bytes formed by concatenating the ocp_ss_byte streams for categories 0 to 31, in that order.

E. Techniques for CPDB Processing of Coded Media Data

Figure 9C:
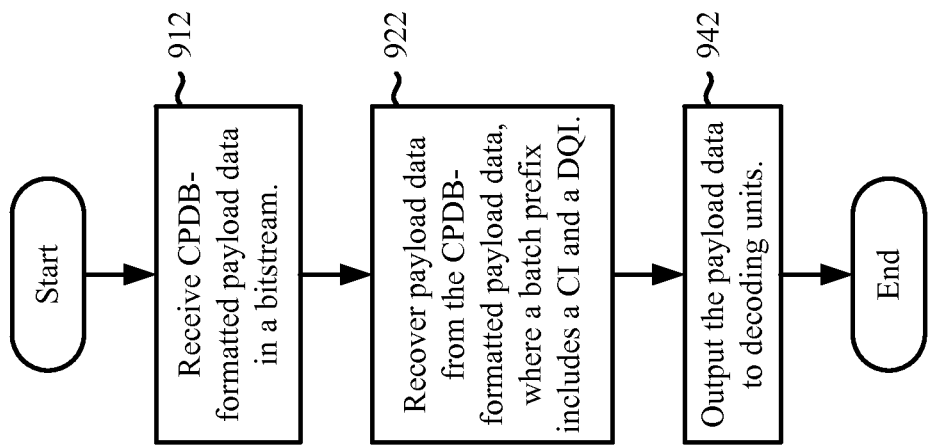
FIGS. 9a-9c are flowcharts illustrating CPDB processing in which a batch prefix for a batch of the CPDB-formatted payload data includes a CI and a DQI.
Figure 9B:
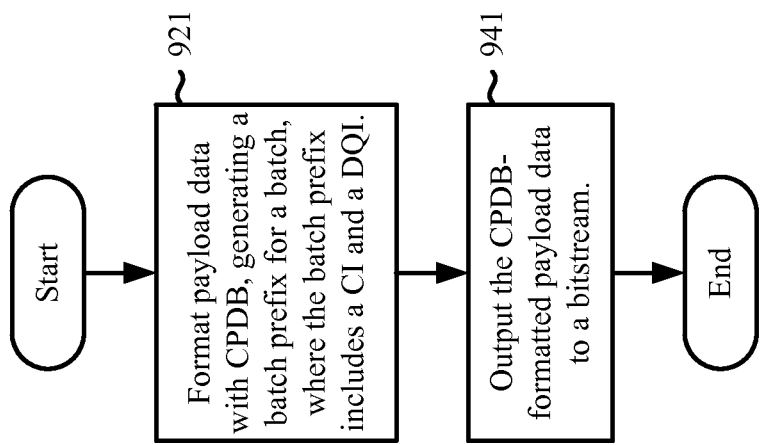
Figure 9A:
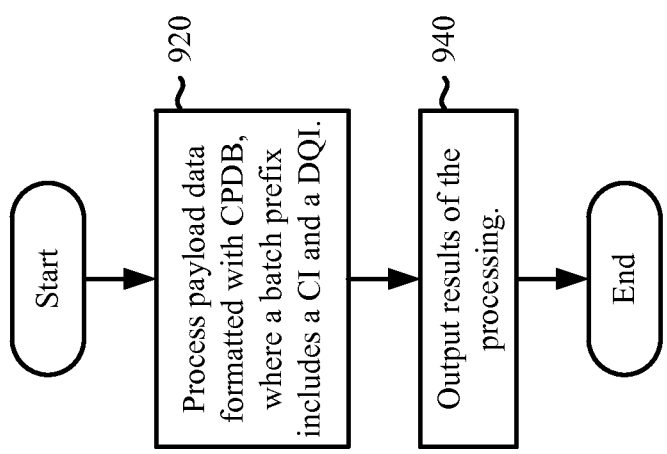

FIG. 9a shows a generalized technique (900) for CPDB processing in which a BP for a batch of the CPDB-formatted payload data includes a CI and a DQI. For example, a formatting tool such as an encoder or multiplexing tool described with reference to FIG. 2a, 2b or 3 performs the technique (900). Or, a formatting tool such as a decoder or demultiplexing tool described with reference to FIG. 2a, 2b or 4 performs the technique (900). Alternatively, another formatting tool performs the technique (900). By performing the technique (900), the formatting tool facilitates parallel processing of coded media data in multiple categories. The multiple categories can represent different wavefront entry points, different spatial regions, different PIPE partition categories, different categories for V2V coding, or different categories for V2F coding.

With reference to FIG. 9a, the formatting tool processes (920) payload data formatted with CPDB. The payload data includes coded media data in multiple categories associated with parallel processing. A BP for a batch of the CPDB-formatted payload data includes a CI and a DQI. The formatting tool outputs (940) results of the processing.

FIG. 9b shows a specific example (901) of the technique (900), focusing on encoder-side activity. For example, a formatting tool such as an encoder or multiplexing tool described with reference to FIG. 2a, 2b or 3 performs the technique (901). Alternatively, another formatting tool performs the technique (901). The formatting tool receives payload data. For example, the formatting tool receives coded media data in multiple categories from different encoding units that operate in parallel. With reference to FIG. 9b, the formatting tool formats (921) the payload data with CPDB, generating a BP for a batch of the CPDB-formatted payload data, where the BP includes a CI and a DQI. The formatting tool outputs (941) the CPDB-formatted data to a bitstream.

As part of the formatting the payload data with CPDB, the formatting tool can split a stream of payload data for a category into multiple batches. For example, as it receives payload data in a stream for a category, the formatting tool determines that a batch is complete when the length of the payload data (for the batch) received in the stream for the category reaches a batch size for the batch. The formatting tool generates a BP for the batch and outputs the batch.

FIG. 9c shows another specific example (902) of the technique (900), but focuses on decoder-side activity. For example, a formatting tool such as a decoder or demultiplexing tool described with reference to FIG. 2a, 2b or 4 performs the technique (902). Alternatively, another formatting tool performs the technique (902). With reference to FIG. 9c, the formatting tool receives (912) CPDB-formatted data in a bitstream. A BP for a batch of the CPDB-formatted payload data includes a CI and a DQI. The formatting tool recovers (922) payload data from the CPDB-formatted data. The formatting tool then outputs (942) the payload data to one or more decoding units of one or more decoders. For example, the formatting tool outputs the payload data to different decoding units that operate in parallel.

As part of the processing at the decoder side, the formatting tool can combine batches when a stream of payload data for a category has been split into multiple batches. For example, the formatting tool recovers payload data for a batch of CPDB-formatted payload data, where the recovered payload data is part of a stream for a category. The formatting tool then combines the recovered payload data for the batch with other payload data from one or more other batches for the category.

In terms of syntax of the BP, the DQI can include a flag that indicates whether the batch has a defined SBS or a CBS that is expressly indicated in the BP. Or, the DQI can include an abbreviated DQI and optional DQI extension. In this case, the abbreviated DQI indicates a defined SBS or indicates that a CBS is used, and the DQI extension, if present, indicates the CBS. For example, the abbreviated DQI has two or more possible values—one value indicates that the CBS is used, and the remaining value(s) indicate different defined SBSs. The BP can further include an indicator bit that indicates whether or not additional batches follow.

In terms of start code emulation prevention, a first byte of the DQI can be constrained to have a value that prevents emulation of start codes across the BP. Further, the DQI can indicate a data quantity that accounts for start code emulation prevention after application of the CPDB to the payload data, where the processing includes evaluating one or more bytes of multiple bytes that end the batch of the CPDB-formatted payload data to check for values of bytes of a start code.

The CPDB-formatted payload data can be organized as multiple separated mode batches and a mixed mode batch. In this case, each of the multiple separated mode batches includes data for a different payload data category among multiple payload data categories, and the mixed mode batch includes any remaining data from all of the multiple payload data categories.

Or, if the number of possible values for the CI is less than number of payload data categories, the payload data categories can be grouped to reduce the number of payload data categories to be less than or equal to the number of possible values for the CI. For example, the payload data categories are grouped based on a mapping factor that depends on the number of payload data categories and the number of possible values for the CI.

Or, each possible value for the CI maps to a different payload data category. Even in this case, however, a batch of CPDB-formatted payload data can include data from multiple payload data categories. The CI for the batch indicates a lowest value of CI among the multiple payload data categories, and the data from the multiple payload data categories is arranged from the lowest to the highest value of CI among the multiple payload data categories. Alternatively, the CI for the batch indicates a highest value of CI among the multiple payload data categories, and the data from the multiple payload data categories is arranged from the highest to the lowest value of CI among the multiple payload data categories.

Figure 10C:
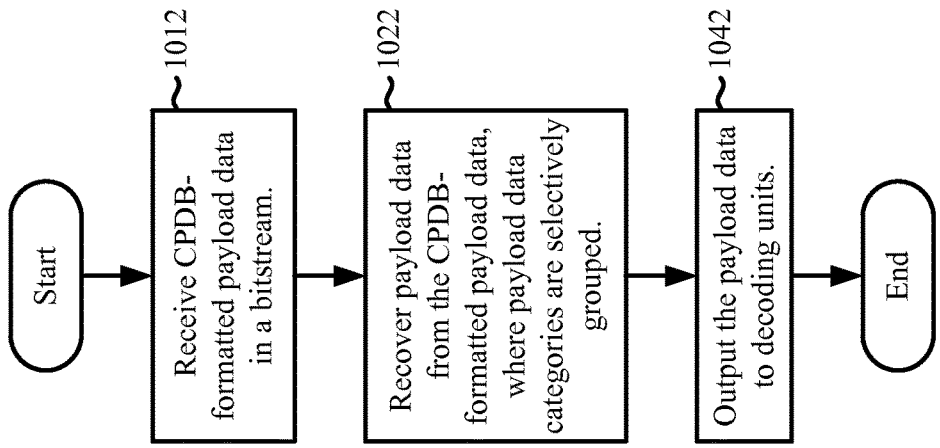
FIGS. 10a-10c are flowcharts illustrating CPDB processing in which payload data categories are selectively grouped.
Figure 10B:
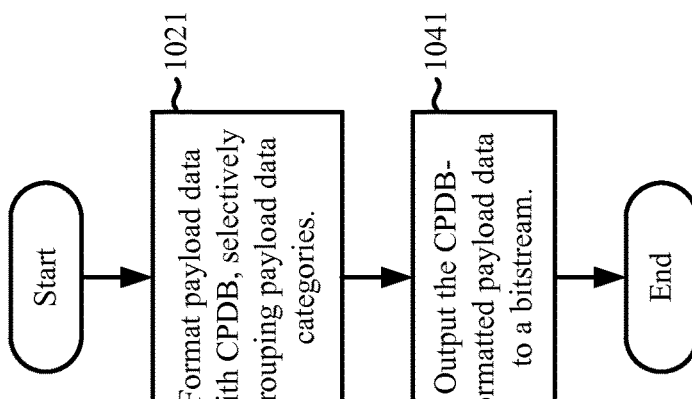
Figure 10A:
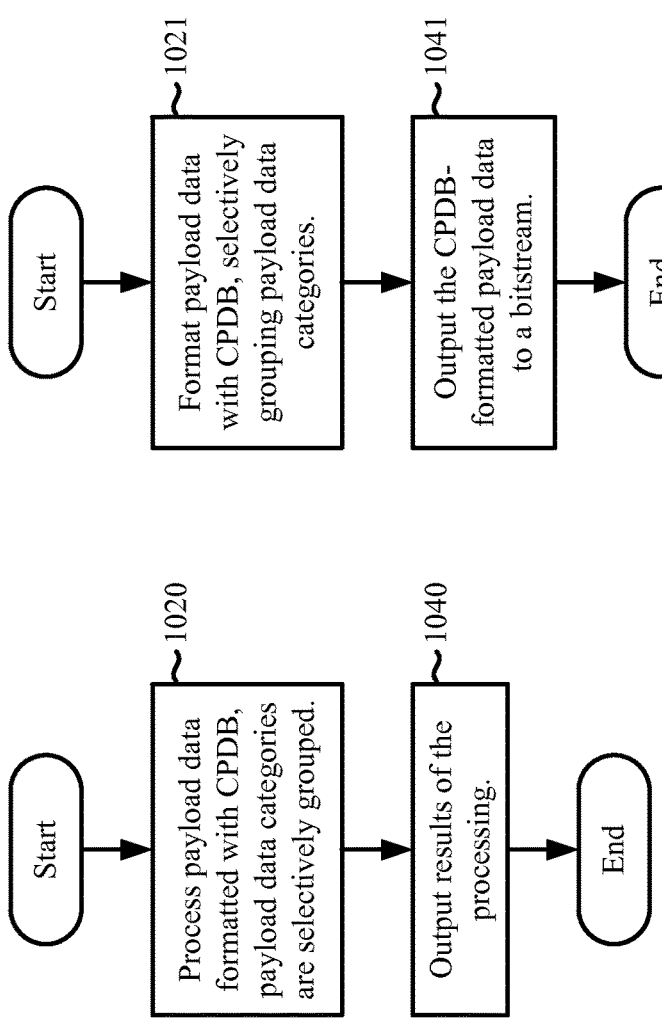

FIG. 10a shows a generalized technique (1000) for CPDB processing in which payload data categories are selectively grouped. For example, a formatting tool such as an encoder or multiplexing tool described with reference to FIG. 2a, 2b or 3 performs the technique (1000). Or, a formatting tool such as a decoder or demultiplexing tool described with reference to FIG. 2a, 2b or 4 performs the technique (1000). Alternatively, another formatting tool performs the technique (1000). By performing the technique (1000), the formatting tool facilitates parallel processing of coded media data in multiple categories.

With reference to FIG. 10a, the formatting tool processes (1020) payload data formatted with CPDB, and payload data categories are selectively grouped. For example, a BP for a batch of the CPDB-formatted payload data includes a CI. If the number of possible values for the CI is less than the number of payload data categories, the payload data categories are grouped to reduce the number of payload data categories to be less than or equal to the number of possible values for the CI. The formatting tool outputs (1040) results of the processing.

FIG. 10b shows a specific example (1001) of the technique (1000), focusing on encoder-side activity. For example, a formatting tool such as an encoder or multiplexing tool described with reference to FIG. 2a, 2b or 3 performs the technique (1001). Alternatively, another formatting tool performs the technique (1001). With reference to FIG. 10b, the formatting tool formats (1021) payload data with CPDB, selectively grouping payload data categories. The formatting tool outputs (1041) the CPDB-formatted data to a bitstream.

FIG. 10c shows another specific example (1002) of the technique (1000), but focuses on decoder-side activity. For example, a formatting tool such as a decoder or demultiplexing tool described with reference to FIG. 2a, 2b or 4 performs the technique (1002). Alternatively, another formatting tool performs the technique (1002). With reference to FIG. 10c, the formatting tool receives (1012) CPDB-formatted data in a bitstream. The formatting tool recovers (1022) payload data from the CPDB-formatted data, in which payload data categories are selectively grouped. The formatting tool then outputs (1042) the payload data to one or more decoding units of one or more decoders.

The examples described with reference to FIGS. 9a-9c for BP syntax options, start code emulation prevention options, etc. can be used in conjunction with the techniques of FIGS. 10a-10c. Also, the examples described with reference to FIG. 9b for encoder-side processing options can be used in conjunction with the technique of FIG. 10b, and the examples described with reference to FIG. 9c for decoder-side processing options can be used in conjunction with the technique of FIG. 10c.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device that implements a formatting tool to facilitate parallel processing of coded media data in multiple batch categories, wherein the computing device is configured to perform operations comprising:
receiving, in a bitstream, payload data formatted with category-prefixed data batching ("CPDB"), wherein the CPDB-formatted payload data includes coded media data organized as multiple batches, wherein the multiple batches include multiple separated mode batches and a mixed mode batch after the multiple separated mode batches in the CPDB-formatted payload data, wherein each of the multiple separated mode batches includes data for a different payload data category among multiple payload data categories, and wherein the mixed mode batch includes any remaining data from all of the multiple payload data categories; and
recovering at least some of the payload data from the CPDB-formatted payload data, including, for each batch of at least some of the multiple batches:
parsing, from a batch prefix for the batch of the CPDB-formatted payload data in the bitstream, a category identifier ("CI") identifying a type of data in the batch, wherein each possible value for the CI maps to a different payload data category associated with a different type of data;
parsing, from the batch prefix for the batch of the CPDP-formatted payload data in the bitstream, a data quantity indicator ("DQI") indicating an amount of data in the batch; and
using the CI and the DQI to store recovered payload data for the batch in a buffer for the type of data in the batch.

2. The computing device of claim 1 wherein payload data categories are grouped to reduce number of payload data categories to be less than or equal to number of possible values for the CI.

3. The computing device of claim 2 wherein the payload data categories are grouped based on a mapping factor that depends on the number of payload data categories and the number of possible values for the CI.

4. The computing device of claim 1 wherein, for at least one of the multiple batches:
the batch of CPDB-formatted payload data includes data from multiple payload data categories;
the CI for the batch indicates a lowest or highest value of CI among the multiple payload data categories;
the data from the multiple payload data categories are arranged from the lowest to the highest value of CI among the multiple payload data categories or vice versa.

5. The computing device of claim 1 wherein a first byte of the DQI is constrained to have a value that prevents emulation of start codes across the batch prefix.

6. The computing device of claim 1 wherein the amount indicated by the DQI accounts for start code emulation prevention after application of the CPDB to the payload data.

7. The computing device of claim 1 wherein, for each of the at least some of the multiple batches, the DQI includes a flag that indicates whether the batch has a defined special batch size or a custom batch size that is expressly indicated in the batch prefix.

8. The computing device of claim 1 wherein, for each of the at least some of the multiple batches, the DQI includes an abbreviated DQI and optional DQI extension, wherein the abbreviated DQI indicates a defined special batch size or indicates that a custom batch size is used, and wherein the DQI extension, if present, indicates the custom batch size.

9. The computing device of claim 8 wherein the abbreviated DQI has two or more possible abbreviated DQI values, wherein one value of the possible abbreviated DQI values indicates that the custom batch size is used, and wherein any remaining values of the possible abbreviated DQI values indicate different defined special batch sizes.

10. The computing device of claim 1 wherein the recovering further includes:
parsing, from the batch prefix for the batch of the CPDP-formatted payload data in the bitstream, an indicator bit that indicates whether or not any additional batches follow.

11. The computing device of claim 1 wherein the multiple batches represent different wavefront entry points, different spatial regions, different partition categories for probability interval partitioning entropy coding, different categories for variable-to-variable coding, or different categories for variable-to-fixed coding, and wherein the type is one of the different wavefront entry points, one of the different spatial regions, one of the different partition categories for probability interval partitioning entropy coding, one of the different categories for variable-to-variable coding, or one of the different categories for variable-to-fixed coding.

12. The computing device of claim 1 wherein the parallel processing uses different decoding units that operate in parallel, and wherein the operations further comprise:
outputting the payload data to the different decoding units that operate in parallel.

13. The computing device of claim 1 wherein, for at least one of the multiple batches, the recovered payload data is part of a stream for a batch category having the type indicated with the CI, and the recovering the at least some of the payload data further includes:
combining the recovered payload data for the batch with other payload data from one or more other batches for the batch category having the type indicated with the CI.

14. In a computing device that implements a formatting tool to facilitate parallel processing of coded media data in multiple batch categories, a method comprising:
receiving, in a bitstream, payload data formatted with category-prefixed data batching ("CPDB"); and
recovering at least some of the payload data from the CPDB-formatted payload data, including:
parsing, from a batch prefix for a current batch of the CPDB-formatted payload data in the bitstream, a category identifier ("CI") identifying a type of data in the current batch, wherein each possible value for the CI maps to a different payload data category associated with a different type of data, and wherein payload data categories are grouped to reduce number of payload data categories to be less than or equal to number of possible values for the CI;
parsing, from the batch prefix for the current batch of the CPDP-formatted payload data in the bitstream, an indicator bit;
using the CI to store recovered payload data for the current batch in a buffer for the type of data in the current batch; and
determining, from the indicator bit, whether or not any additional batches follow the current batch.

15. The method of claim 14 wherein the payload data categories are grouped based on a mapping factor that depends on the number of payload data categories and the number of possible values for the CI.

16. A memory or storage device storing computer-executable instructions for causing one or more processing units, when programmed thereby, to perform operations comprising:
receiving, in a bitstream, payload data formatted with category-prefixed data batching ("CPDB"); and
recovering at least some of the payload data from the CPDB-formatted payload data, including:
parsing, from a batch prefix for a batch of the CPDB-formatted payload data in the bitstream, a category identifier ("CI") identifying a type of data in the batch, wherein each possible value for the CI maps to a different payload data category associated with a different type of data;
parsing, from the batch prefix for the batch of the CPDP-formatted payload data in the bitstream, a data quantity indicator ("DQI") indicating an amount of data in the batch, wherein a first byte of the DQI is constrained to have a value that prevents emulation of start codes; and
using the CI and the DQI to store recovered payload data for the batch in a buffer for the type of data in the batch.

17. The memory or storage device of claim 16 wherein the recovered payload data is part of a stream for a batch category having the type indicated with the CI, and the recovering the at least some of the payload data further includes:
combining the recovered payload data for the batch with other payload data from one or more other batches for the batch category having the type indicated with the CI.

18. A computing device comprising one or more processing units, memory, and storage, wherein the memory and/or storage have stored therein computer-executable instructions for causing the computing device, when programmed thereby, to perform operations to facilitate parallel processing of coded media data in multiple batch categories, the operations comprising:
receiving, in a bitstream, payload data formatted with category-prefixed data batching ("CPDB"), wherein the CPDB-formatted payload data includes coded media data organized as multiple batches, the multiple batches including multiple separated mode batches and a mixed mode batch after the multiple separated mode batches in the CPDB-formatted payload data;
for each of the multiple separated mode batches:
parsing, from the bitstream, a batch prefix that includes a category identifier ("CI") that identifies type of data in the separated mode batch; and
using the CI to store recovered payload data for the separated mode batch in a buffer for the type of data in the separated mode batch, the recovered payload data for the separated mode batch including coded media data for a single payload data category among multiple payload data categories;
determining, as payload data for the mixed mode batch, any remaining coded media data from all of the multiple payload data categories; and
combining the remaining coded media data in the mixed mode batch with corresponding data from the multiple separated mode batches.

19. The computing device of claim 18 wherein, for one of the multiple separated mode batches, the recovered payload data is part of a stream for a batch category having the type indicated with the CI, and the operations further include, for one of the multiple separated mode batches:
combining the recovered payload data for the separated mode batch with other payload data from one or more other separated mode batches for the batch category having the type indicated with the CI.

20. The computing device of claim 18 wherein each possible value for the CI maps to a different payload data category associated with a different type of data.

21. The computing device of claim 18 wherein, for each of the multiple separated mode batches, the batch prefix further includes a data quantity indicator ("DQI") that indicates an amount of data in the separated mode batch.

22. The method of claim 14, wherein the payload data for the current batch is received in a stream for a batch category having the type of data identified by the CI, and wherein the recovering further comprises:
  determining that the current batch is complete when length of the payload data received in the stream for the batch category for the current batch reaches a batch size for the current batch.

23. The method of claim 14 wherein the CPDB-formatted payload data are organized as multiple batches, wherein the multiple batches include multiple separated mode batches and a mixed mode batch after the multiple separated mode batches in the CPDB-formatted payload data, wherein each of the multiple separated mode batches includes data for a different payload data category among the payload data categories, and wherein the mixed mode batch includes any remaining data from all of the payload data categories.

24. The memory or storage device of claim 16 wherein the CPDB-formatted payload data are organized as multiple batches, wherein the multiple batches include multiple separated mode batches and a mixed mode batch after the multiple separated mode batches in the CPDB-formatted payload data, wherein each of the multiple separated mode batches includes data for a different payload data category among multiple payload data categories, and wherein the mixed mode batch includes any remaining data from all of the multiple payload data categories.

* * * * *